J. G. P. THOMAS.
WINDING APPARATUS.
APPLICATION FILED JUNE 29, 1912.

1,076,614.

Patented Oct. 21, 1913.

Witnesses
Andrew Smith.
Adda Thomas

Inventor
John Godfrey Parry Thomas
per. Eugene C. Brown
Attorney

UNITED STATES PATENT OFFICE.

JOHN G. P. THOMAS, OF HOLYWELL VICARAGE, WALES.

WINDING APPARATUS.

1,076,614.  Specification of Letters Patent.  Patented Oct. 21, 1913.

Application filed June 29, 1912. Serial No. 706,670.

*To all whom it may concern:*

Be it known that I, JOHN GODFREY PARRY THOMAS, a subject of the King of Great Britain, residing at Holywell Vicarage, Wales, have invented new and useful Improvements in Winding Apparatus, of which the following is a specification.

This invention relates to an improved power transmission mechanism for intermittent work such as crane work rolling mills and the like, and provides means whereby power may be stored separately during times of rest or light load, and returned at times of heavy load, the power thus stored being received and returned electrically. To this end an auxiliary electrical machine is provided which is interconnected with the prime motor and load through a balance gearing so that power may pass from the prime motor either to the load or to the auxiliary machine. Excess power may be stored either in a secondary battery or better in a fly wheel driven by an electric motor; the battery or motor being joined to the auxiliary machine. If desired there may be an electrical machine on the load shaft also from which power may be taken for storing.

Figure 1:
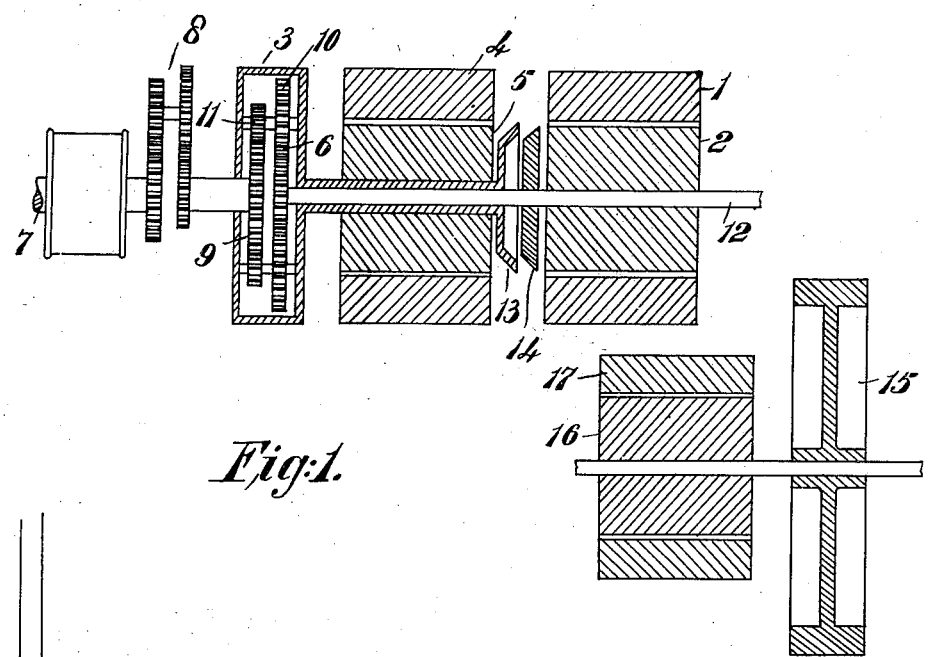
Figure 2:
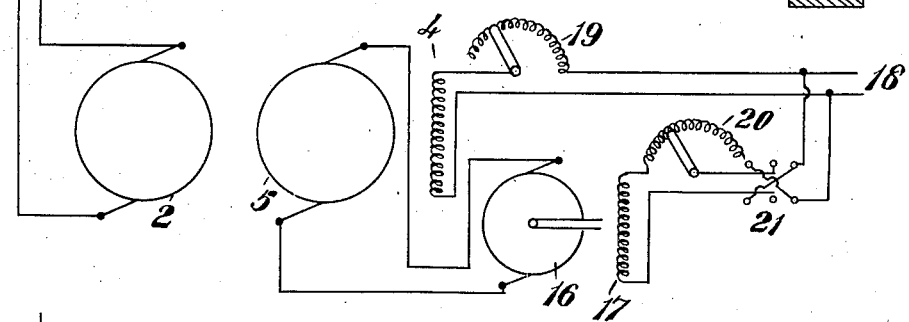
Figure 3:
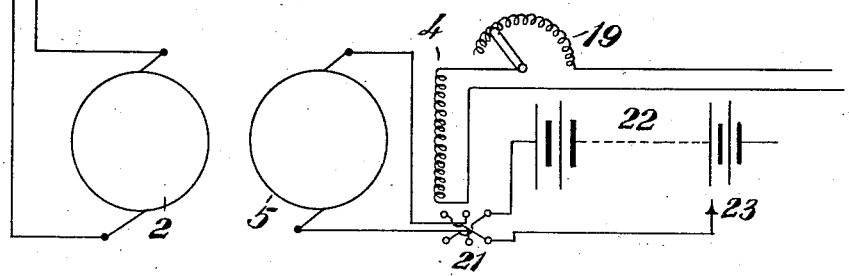

The invention is illustrated in the accompanying drawings in which:

Figure 1 shows diagrammatically the machines used in one form of the invention; Fig. 2 shows the electrical connections for Fig. 1, and Fig. 3 illustrates the modification in which power is stored in a battery.

The forms of the invention hereinafter described are particularly designed for winding gear, but will serve with slight modification for other intermittent work such as the driving of rolling mills and the like, or even in the case of Fig. 3 for driving vehicles.

In Fig. 1 the prime motor is indicated as an electric motor of which 1 is the field and 2 the armature. The latter is secured upon a shaft 12 and drives through it the smaller sun wheel 6 of a spur wheel epicyclic or balance gearing. Through this gearing the prime motor can transmit power to the auxiliary electrical machine 4, 5 the armature 5 of which is mounted on a sleeve carrying the casing 3 of the gearing, and also to the load shaft 7 which is joined directly or through suitable reduction gearing 8 to the larger sun wheel 9. The sun wheels are interconnected and driven through sets of planet wheels 10, 11, the spindles of which are mounted in the casing 3. A clutch 13, 14, the parts of which are secured to the armatures 5 and 2 respectively, and which may conveniently be magnetic, serves to lock the epicyclic gearing so that it rotates solidly.

The means for temporarily storing power consists in this case of a fly wheel 15 driven by or driving the armature 16 of an electric motor 16, 17. This device is quite separate mechanically from the apparatus driving the load shaft, but there is electrical connection between the machines 4, 5 and 16, 17. This electrical connection may be readily understood from Fig. 2. There the armatures 5 and 16 are shown as directly connected, their fields 4 and 17 being separately excited from mains 18 or in any other suitable manner. Each field has a rheostat 19 and 20 respectively in its circuit, and a switch 21 serves to reverse the excitation of field 17. The prime motor 1, 2 may be an A. C. motor and is indicated as supplied from separate mains.

When this apparatus is to be brought into operation it is first necessary to start the fly-wheel in motion. To do this the winding drum on the load shaft is held stationary by the usual brake and the prime motor is started up. The machine 4, 5 is thus driven backward through the gearing 6, 10, 11, 9, 3. Its field is made, and so is that of the machine 16, 17 hereinafter called the booster. The booster field is fully excited and that of the dynamo-electric machine 4, 5 is gradually built up so that the generator drives the booster as a motor and sets the fly wheel 15 in motion. When the fly wheel has been brought up to normal speed only a small current is required from the generator to maintain its speed and its energy can be brought to the aid of the prime motor. To start the lead shaft the brake is released and the field of the booster weakened. This increases the current delivered by the dynamo-electric machine 4, 5 and therefore the torque on its shaft and so increases the torque on the shaft 12. The torque transmitted to the load shaft increases proportionally and the shaft starts and accelerates. When the field of the booster is reduced to zero the armature 5 will be held almost stationary. If the booster field is then reversed and increased in the opposite direction, power will be delivered by the booster to the machine, 4, 5 which will reverse its direction of motion and run as a motor in the same sense as the prime motor and load shaft. The energy it receives is, of course, taken from the fly-wheel 15. When the generator has been brought up to the same speed as the prime motor and load shaft the clutch 13, 14 may be put in so that there is no relative motion of the gearing nor any transmission of electrical energy from machine 16, 17 to machine 4, 5. This is the condition for steady running. Should the load be light so that the power supplied by the prime motor is more than sufficient to lift it at a steady speed, the booster field may be weakened relatively to that of the machine 4, 5 and there will be a reverse current between the machines so that the armature 16 is electrically driven in the same direction as at first because its field is reversed. The excess energy is thus stored in the fly wheel.

To stop the load shaft the prime motor is put out of action and the field of the booster gradually decreased to zero. The moving load then drives both the prime motor and the dynamo-electric machine 4, 5 the gearing being still locked by the clutch 13, 14. The prime motor rotates idly, but the generator supplies current to the booster and speeds up the fly wheel, thus transferring to it the kinetic energy of the load. The ordinary brake may be applied to the load shaft to finally bring it to a standstill.

The load can be stopped by the brake alone, the clutch being disengaged, without stopping the prime motor; the circuit between the machines 4, 5 and 16, 17 would be broken during such stopping.

If the prime motor is not self-starting, whether it be electrical or not, the energy of the fly-wheel may be employed to start it, and that in either direction. For this purpose the load shaft is held still and the machine 16, 17 caused to supply current to the machine 4, 5.

At any time the direction of motion of the load shaft may be reversed by reversing the prime motor and the field of the dynamo-electric machine 4, 5. Or a reversing gear may be provided on the load shaft.

In the modification shown in Fig. 3 a battery 22 replaces the parts 15, 16, 17. This is bridged across the armature 5, the variable connection 23 serving to include a greater or less number of cells in circuit. By means of this connection and switch 21 substantially the same steps of control may be obtained as in the arrangement above described.

If desired there may be another electrical machine upon or geared to the load shaft 7 from which energy may be delivered to the flywheel 15. The parts may thus form a power transmission system complete in itself, for example similar to that described in my Patent No. 948436, having the electrical machine on the load shaft connected with the generator corresponding to the machine 4, 5, and the separate dynamo and flywheel for storing energy may be connected at proper times to the generator or the machine on the load shaft.

Obviously the form of gearing is open to variation. Bevel gearing of the balance type can be adopted in some cases; and again the members of the gearing may be differently connected to the machines—for example the prime motor 1, 2, and the generator 4, 5 might be interchanged.

By balance gearing is to be understood a gearing which will interconnect the three parts concerned, viz. the prime motor, the load shaft, and the dynamo-electric machine, in such manner that when the speeds of any two are known, the speed of the third is determinate.

What I claim is:

1. In an electrical power transmission system for intermittent loads, the combination with a load shaft and driving motor, of an auxiliary electrical generator, balance gearing interconnecting said load shaft, motor and generator, and separate means for receiving or restoring excess electrical power.

2. In an electrical power transmission system, the combination of a prime motor, a load shaft, an auxiliary electrical generator, balance gearing interconnecting said motor, load shaft and generator, and a reservoir device adapted to take excess electrical power from, or restore it to, said generator.

3. In an electrical power transmission system, the combination of a prime motor, a load shaft, an electrical generator, balance gearing interconnecting said shaft, motor, and generator, and a separate electrical machine adapted to take energy from or give it to said generator.

4. In an electrical power transmission system, the combination of a driving motor, a load shaft, an electrical generator, balance gearing interconnecting said motor, shaft and generator, an auxiliary electrical machine adapted to store energy kinetically, and connections between said machine and the generator.

5. In an electrical power transmission system the combination of a driving motor, a load shaft, an electrical generator, balance gearing interconnecting said motor, shaft and generator, means for receiving electrical energy from said generator or restoring such energy, and means for controlling the output of said generator.

6. In an electrical power transmission system, the combination of a driving motor, a load shaft, an electrical generator, balance gearing interconnecting said motor, shaft and generator, a separate electrical machine adapted to store energy kinetically, and means for controlling said generator and separate machine.

7. In an electrical power transmission system, the combination of a driving motor, a load shaft, an electrical generator, balance gearing interconnecting said motor, shaft and generator, a separate electrical machine, a flywheel attached thereto, and connections between said separate machine and the generator.

8. In an electrical power transmission system, the combination of a driving motor, a load shaft, an electrical generator, balance gearing interconnecting said motor, shaft and generator, an electrical machine on said load shaft, and means connected with said generator and load shaft machine for receiving or imparting energy electrically and storing it kinetically.

9. In an electrical power transmission system, the combination of a driving motor, a load shaft, an electrical generator, balance gearing interconnecting said motor, shaft and generator, an electrical machine on said load shaft, a separate electrical machine arranged to store energy kinetically, and connections between said separate machine and the generator on the load shaft.

In testimony whereof I have signed my name to this specification in the presence of two subscribing witnesses.

J. G. P. THOMAS.

Witnesses:
A. E. O'DELL,
L. E. HAYNES.